United States Patent
Burgos

(10) Patent No.: US 12,442,458 B2
(45) Date of Patent: Oct. 14, 2025

(54) EXPLOSION VENTING PANEL WITH ITS TIGHTENING ADJUSTMENT SYSTEM FOR ITS FIXING

(71) Applicant: STIF FRANCE, Saint-Georges-sur-Loire (FR)

(72) Inventor: José Burgos, La Possonnière (FR)

(73) Assignee: STIF FRANCE, Saint-Georges-sur-Loire (FR)

( * ) Notice: Subject to any disclaimer, the term of this patent is extended or adjusted under 35 U.S.C. 154(b) by 58 days.

(21) Appl. No.: 18/612,798

(22) Filed: Mar. 21, 2024

(65) Prior Publication Data
US 2024/0369149 A1 Nov. 7, 2024

(30) Foreign Application Priority Data
May 5, 2023 (FR) ........................ 2304523

(51) Int. Cl.
*F16K 17/40* (2006.01)
*F16K 17/16* (2006.01)

(52) U.S. Cl.
CPC ............ *F16K 17/403* (2013.01); *F16K 17/16* (2013.01); *F16K 17/40* (2013.01)

(58) Field of Classification Search
CPC ......... F16K 17/403; F16K 17/40; F16K 17/16
USPC ....... 137/12, 68.19, 68.23, 68.28, 68.11, 467
See application file for complete search history.

(56) References Cited

U.S. PATENT DOCUMENTS

| | | | | |
|---|---|---|---|---|
| 4,207,913 A * | 6/1980 | Fike, Jr. | ............... | F16K 17/162 137/910 |
| 6,367,203 B1 * | 4/2002 | Graham | ................ | B65D 90/36 52/98 |
| 6,607,003 B1 * | 8/2003 | Wilson | .................... | F16K 17/16 137/68.27 |
| 7,234,278 B2 | 6/2007 | Eijkelenberg et al. | | |
| 8,322,360 B2 * | 12/2012 | Wilson | ..................... | E04B 1/98 220/89.2 |
| 8,418,412 B2 * | 4/2013 | Cheng | ...................... | E06B 5/12 52/100 |
| 8,726,588 B2 * | 5/2014 | Jakus | ..................... | B65D 90/36 52/99 |
| 2002/0112756 A1 * | 8/2002 | Farwell | ................ | F16K 17/162 137/68.19 |
| 2005/0235584 A1 * | 10/2005 | Farwell | ................... | F16K 17/16 52/202 |

(Continued)

FOREIGN PATENT DOCUMENTS

FR 2675075 A1 10/1992
FR 2943043 A1 9/2010
WO 2017106204 A1 6/2017

*Primary Examiner* — Minh Q Le
(74) *Attorney, Agent, or Firm* — INNOVATION CAPITAL LAW GROUP, LLP; Vic Lin

(57) ABSTRACT

An explosion venting panel (1) comprising a metallic sheet (4) with a weakening zone, a frame (6) called clamping frame, which is laid out on the rim of the sheet (4), and at least one sealing gasket (5, 7), in particular a sealing gasket called support gasket (5), which is laid out at least on the rim and against the sheet (4) opposite to the clamping frame (6), and tightening adjustment means (8), wherein the panel comprises fixing openings (10) all through the clamping frame (6), the sheet (4) and said at least one sealing gasket (5, 7), characterized in that the tightening adjustment means (8) are integrated in a monobloc way to the sheet (4).

13 Claims, 4 Drawing Sheets

(56) References Cited

U.S. PATENT DOCUMENTS

| | | | |
|---|---|---|---|
| 2013/0225064 A1* | 8/2013 | Jakus | F16K 17/16 |
| | | | 454/340 |
| 2013/0255792 A1* | 10/2013 | Eijkelenberg | F16K 17/16 |
| | | | 137/13 |
| 2015/0053279 A1* | 2/2015 | Farwell | F16K 17/40 |
| | | | 137/68.11 |
| 2017/0074412 A1* | 3/2017 | Bunse | F16K 17/36 |
| 2017/0130853 A1* | 5/2017 | Wilson | F16K 17/40 |
| 2019/0367146 A1* | 12/2019 | Wood | B64C 1/18 |
| 2022/0356957 A1* | 11/2022 | Guzman | F16K 17/162 |
| 2024/0429545 A1* | 12/2024 | Lin | F16K 17/16 |

* cited by examiner

EXPLOSION VENTING PANEL WITH ITS TIGHTENING ADJUSTMENT SYSTEM FOR ITS FIXING

BACKGROUND OF THE INVENTION

The invention relates to the field of explosion venting panels.

Explosion venting panels limitless protect storage enclosures, such as silos, hoppers, driers, tanks, filtration systems, bucket elevators, etc., or machines for material processing. These enclosures or machines store powdered products or gases that, under certain conditions, may explode or induce a rise of pressure and temperature in the enclosure, which may result in an explosion. In this case, explosion venting panels are able to tear in their weakening zone in case of abnormal overpressure in the enclosures, which generates a hole, through which the pressured gas can flow out.

Explosion venting panels usually comprise a metallic sheet, called rupture sheet, which comprises a weakening zone close to the peripheral edge of the sheet, an upper frame located on and around the sheet, which is used to fix the explosion venting panel, and at least one sealing gasket located under and peripheral to the rupture sheet and covering the weakening zone. An interface sealing gasket between the upper frame and the rupture sheet is usual too. The explosion venting panel is fixed around the enclosure opening to protect thanks to screwing means that cooperate with fixing holes all around the panel, close to the weakening zone. The peripheral frame, the interface gasket, the rupture sheet and the sealing gasket comprise borings in front of and all around the panel to constitute fixing holes into which the screwing means are designed for insertion.

The tightening of the screwing means secures the compression of the sealing gaskets. Thus, they fully fulfill their function. Tightening rules are specified, so that the sealing gaskets, in particular the gasket under the rupture sheet, leisurely seal and are not crushed. Indeed, the crushing of the gasket can induce a torn weakening zone immediately next to the fixing zone and a damaged panel that becomes inoperable. To make the adjustment of the tightening easier for the operator, in particular without need of a torque wrench, it is known from the patent FR2943043B1, to insert spacers into fixing holes for the panel, with a given height and suitable looseness that matches the suitable crushing of the sealing gasket under the rupture sheet. When tightening the screwing means into a fixing hole, the gasket is squeezed and the operator necessarily realizes that the right tightening is reached, because the spacer hits the structure of the enclosure. Then, the compression of the sealing gasket is in accordance with the expected value, in an homogeneous way all around the explosion venting panel.

However, it is required that the operator does not forget spacers in each of the various fixing holes. If they forget, the optimization of the tightening and compression of the gasket is not guaranteed.

SUMMARY OF THE INVENTION

Thus, the aim of the invention is to provide an alternative solution to the manual means of usual monitoring of the fixing means for an explosion venting panel, in particular without the previously mentioned drawback.

The invention relates to an explosion venting panel comprising a metallic sheet called a rupture sheet, with a weakening zone (able to tear in case of overpressure in the structure to which the explosion venting panel is fixed), a frame called clamping frame, which is laid out on the rim of the rupture sheet, and at least one sealing gasket, in particular a sealing gasket called support gasket, which is laid out at least on the rim and against (a face of) the rupture sheet opposite to the clamping frame (wherein the support gasket is designed to lean on the structure to protect), and tightening adjustment means (that make it possible to tighten tightening means for fixing the explosion venting panel according to the suitable sealing height of the gasket), wherein the explosion venting panel further comprises fixing openings all through the clamping frame, the rupture sheet and said at least one sealing gasket. The explosion venting panel is characterized in that the tightening adjustment means are integrated in a monobloc way to the rupture sheet. "Integrated in a monobloc way to the rupture sheet" about the tightening adjustment means refers to the fact that the tightening adjustment means are solidary in a non-removable way with the rupture sheet.

Thus, thanks to the very integration of the tightening adjustment means, in particular thanks to the direct integration to the rupture sheet sandwiched between the clamping frame and the support gasket, the operator no more has to take care of bringing removable adjustment means, which prevents the risk of forgetting them. In addition, no more inserts are required at the fixing openings, thus no more interface parts are required between the sealing gaskets and the tightening means, which allows a direct cooperation of the screwing means, such as screws or threaded rods, with the at least one seal gasket that guarantees perfect watertightness by insertion of the sealing material into the thread of the screws when pressing.

According to a characteristic, the tightening adjustment means are laid out on at least a face of the rupture sheet and around borings that are parts of the fixing openings, preferably on at least the face called lower face of the sheet relatively to the support gasket.

Advantageously, since the sheet has two opposite faces (called lower face and upper face), the tightening adjustment means are laid out on the two opposite faces of the sheet and around fixing openings. When another sealing gasket called interface gasket is sandwiched between the rupture sheet and the clamping frame, this makes it possible to get some balanced compression on both sides (against each faces) of the rupture sheet.

According to a preferential embodiment, the tightening adjustment means constitute embossments, in particular resulting from a strain induced by stamping of the sheet. Since the embossments preferably result from the strain by stamping of the metallic rupture sheet generate, with reference to the previously referred patent FR2943043B1, a process to manufacture the explosion venting panel that requires more time and tools, because of the stamping step. However, the monobloc integration of the embossments has several advantages, such as those quoted above. The embossments are male items that constitute stop elements, with their rigid surface opposite to the rupture sheet and against which the sealing gasket squeezes; when stopped, the operator feels a hardening when tightening, which means that the suitable compression has been reached.

According to a preferential characteristic, the adjustment means constitute an alternation of several embossments on each of the faces of the rupture sheet. In particular, the embossments are distributed all around a boring of the sheet that constitutes a part of a fixing opening, wherein the distribution of the embossments on the two opposite faces of the sheet is such that the embossment of a face and the embossment immediately next to the opposite face constitute a pair, whose discrepancy is shorter than the discrepancy in another pair of embossments.

Advantageously, the tightening adjustment means are distributed in a balanced way all around the fixing openings (wherein all around each boring of the sheet is part of each of the fixing openings).

According to yet another characteristic, said at least one sealing gasket comprises through holes in front of the tightening adjustment means. Thus, at compression of said at least one gasket, these holes through the at least one seal gasket allow the embossments to go through the gasket and abut a rigid surface.

According to another characteristic, the fixing openings for the panel are made of borings in front of each other that are manufactured through the clamping frame, the rupture sheet and said at least one seal gasket, in particular through the support gasket and the interface sealing gasket when it is laid out between the clamping frame and the rupture sheet. Advantageously, said at least one sealing gasket, in particular the support gasket, comprises borings that constitute parts of the fixing openings, wherein each boring in said at least one gasket has a diameter adjusted to the section of tightening means designed for introduction into the fixing openings, in particular so that the material of the gasket is designed for insertion into the thread of the threaded bodies of the tightening means for fixing by tightening the explosion panel.

Thus, according to a characteristic, each sealing gasket comprises borings (that are parts of the fixing openings for the panel, into which tightening means for the fixing of the panel are designed for introduction), and holes around each boring to give way to the tightening adjustment means mechanically fastened to the rupture sheet.

In particular, the explosion venting panel is designed for use with silos, tanks, battery containers, filtration systems or handling machines or machines for material processing.

BRIEF DESCRIPTION OF THE DRAWINGS

The present invention is now described thanks to examples that are only illustrative and not restrictive relatively to the scope of the invention, and from the appended figures, where.

DETAILED DESCRIPTION OF THE PREFERRED EMBODIMENTS

The explosion venting panel 1 according to the invention as pictured on the figures is designed for use to protect a structure against an explosion in case of abnormal overpressure inside.

Figure 5:
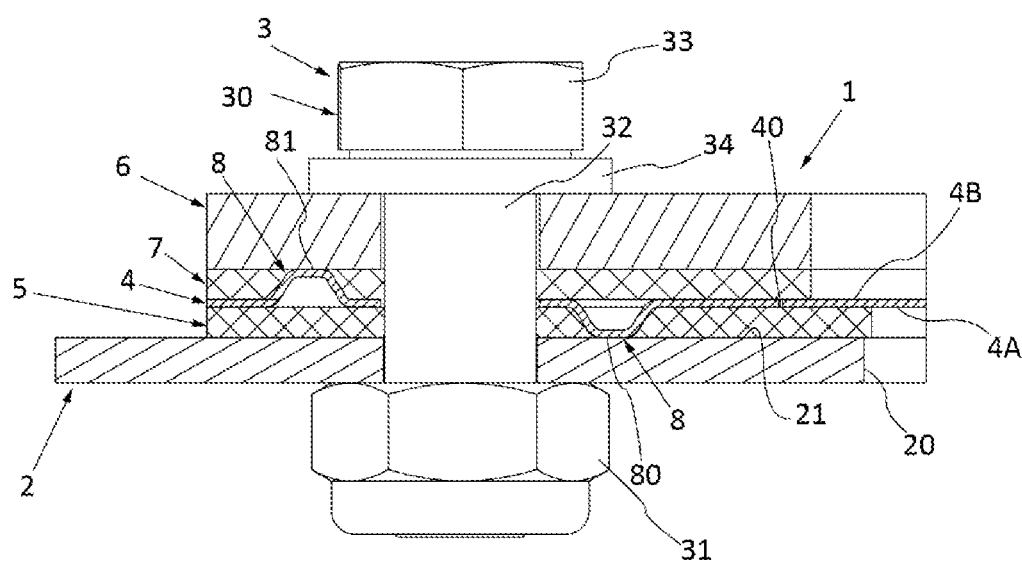
FIG. 5 is FIG. 4 with the explosion venting panel in fixed position against the enclosure thanks to bolting type tightening means.

Thus, the explosion venting panel 1 as pictured on FIG. 5 watertightly seals an opening 20 of a structure or enclosure 2. The explosion venting panel 1 is fixed to the structure 2 and all around the opening 20 by screwing means 3 that extend through both the explosion venting panel 1 via fixing openings 10 and the structure 2. In case of overpressure, the central part of the explosion venting panel 1 is able to tear.

As mounted in FIG. 1 and FIG. 2, the explosion venting panel 1 comprises a metallic sheet 4, called rupture sheet below, which comprises a weakening zone 40, a sealing gasket 5, called support gasket, which is pressed against one of the faces (called lower face 4A) of the sheet 4 and which is designed to lean against the enclosure 2, a frame 6, preferably metallic, that is used as a clamping of the sheet 4 against the enclosure 2, and preferably a sealing gasket 7, called interface sealing gasket, that is pressed against the other face of the sheet 4 opposite to the support gasket 5, and against which the clamping frame 6 is pressed. Thus, the interface seal gasket 7 is sandwiched between the clamping frame 6 and the sheet 4. The support gasket 5 is sandwiched between the sheet 4 (opposite to the clamping frame 6) and the enclosure 2 when the explosion venting panel 1 is installed on the enclosure 2. Furthermore, when fixing the panel, the explosion venting panel 1 comprises tightening adjustment means 8 that make it possible to the operator to feel when the suitable tightening of the tightening means 3 is reached by suitably pressing the support gasket 5.

Here, the explosion venting panel 1 has a rectangular shape, but it could be squared or circular or have another shape.

The sheet 4 is designed to seal the opening of the enclosure 2 in a watertight way thanks to the support seal gasket 5. The sheet 4 is preferably between 0.5 and 1.2 mm thick, for example ca. 0.8 mm thick. The weakening zone 40 is positioned in the thickness of the sheet 4 and is able to break in case of overpressure in the enclosure 2. For example, the weakening zone 40 is made of discontinuous slots in the thickness of the sheet 4, usually made with a laser and linked by full breakable parts. The weakening zone 40 is located along all or a part of the circumference of the sheet 4 and close to the periphery of the frame 6. According to the embodiments of the explosion venting panel 1, the weakening zone 40 can extend all around the sheet 4 or only along such a part as the U shape as in FIG. 2. In addition, the sheet 4 can comprise rigidification folds 41, for example diamond-shaped folds. The invention applies to any type of rupture sheet 4, in particular to any type of layout for the weakening zone 40. Thus, the sheet 4 will not be further described here.

Figure 4:
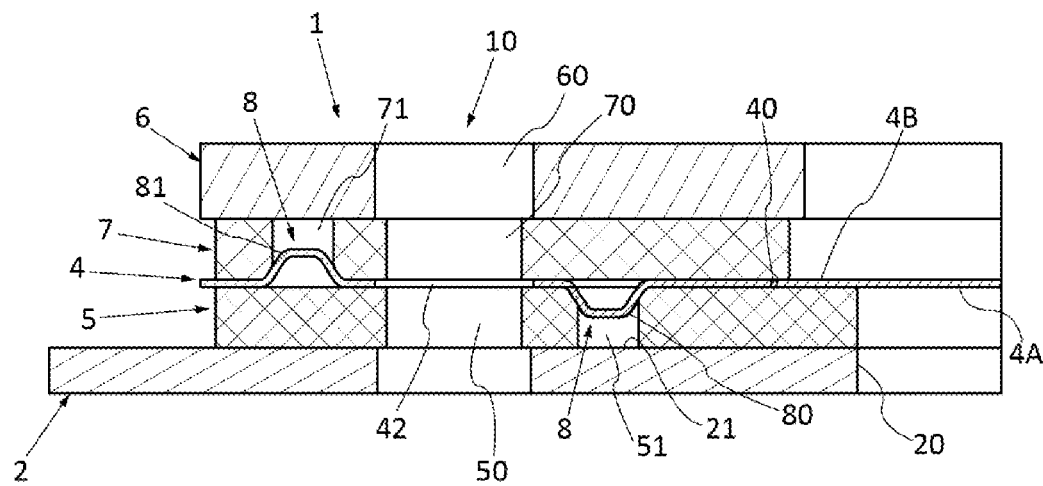
FIG. 4 shows a partial cross-sectional view of the explosion venting panel of FIG. 1 along the thickness of the panel and along a plane that extends through a fixing opening of the panel, wherein the explosion venting panel is positioned on and around an opening of an enclosure to protect.

The support gasket 5 makes it possible to secure the peripheral watertightness between the explosion panel 1, more specifically between the sheet 4 and the enclosure 2. The support gasket 5 is made of a compressible and possibly food-grade material, and is made of a known material. The support gasket 5 is preferably made solidary with the sheet 4 by bonding when manufacturing the explosion venting panel. The support gasket 5 constitutes a frame with the shape of the periphery of the sheet 4 and that covers the weakening zone 40 on the lower face 4A of the sheet (FIGS. 4 and 5). As a variant, the support gasket 5 could cover all the lower face 4A of the sheet designed to be in front of the enclosure 2.

The clamping frame 6 has a shape that matches the periphery of the sheet 4.

The interface gasket 7 has a shape that matches the one of the clamping frame 6. The interface gasket 7 also covers the weakening zone 40 (FIGS. 4 and 5).

The support gasket 5 and the interface gasket 7 are preferably inserted by bonding on each face of the sheet 4, respectively on the lower face 4A and on the upper face 4B of the sheet 4. In a variant, the interface gasket 7 can be inserted by bonding against the clamping frame 6.

The explosion venting panel 1 is fixed on all its periphery thanks to the fixing means 3, in particular thanks to bolting means. As an example of the tightening means 3, the tightening means 3 comprise a screw 30 and a nut 31 as well. The screw 30 comprises a threaded body 32 all through the explosion venting panel 1 and the enclosure 2, and a head 33 that is accessible from the outside of the panel 1 relatively to the clamping frame 6. The nut 31 cooperates with the body 32 of the screw opposite to the head 33 and on the inside of the enclosure 2. Preferably, a washer 34 is located between the screw head 33 and the clamping frame 6.

Figure 1:
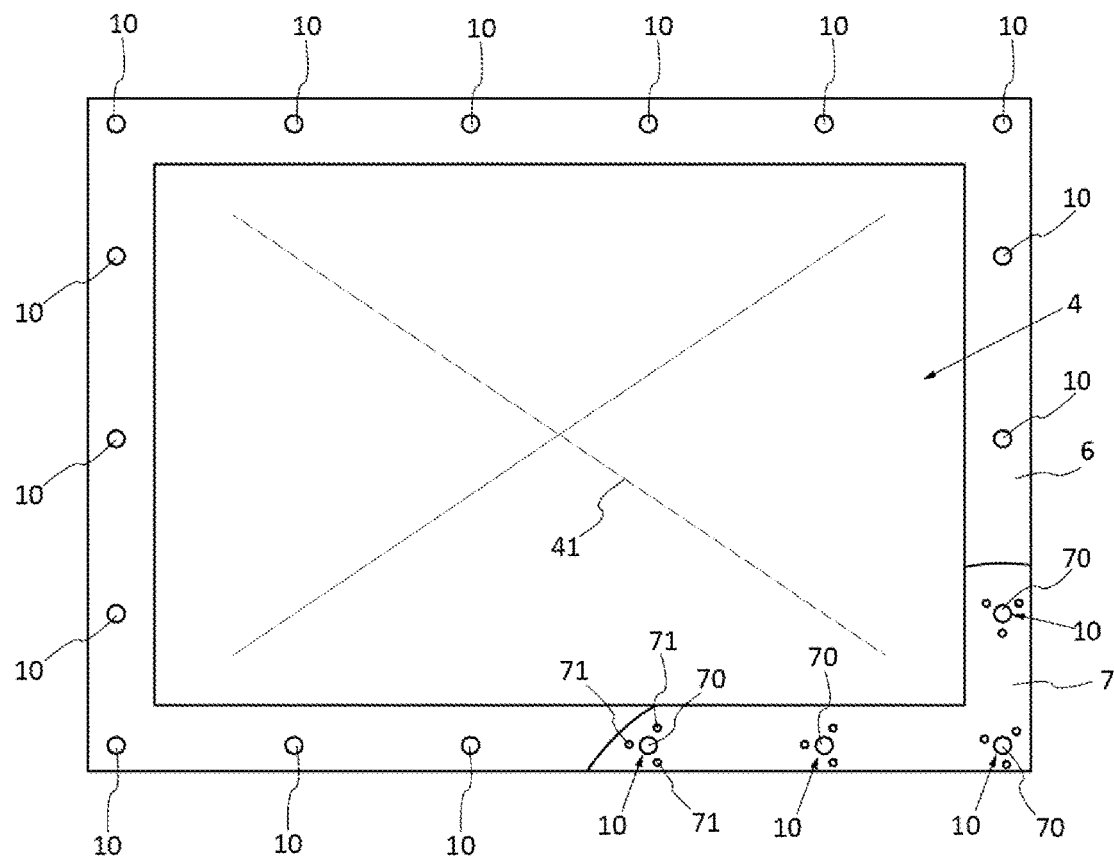
FIG. 1 shows a view from above of an example of an explosion venting panel according to the invention, with a part of the upper clamping frame has been removed to show the underside of said frame-here to show the interface sealing gasket just below.
Figure 2:
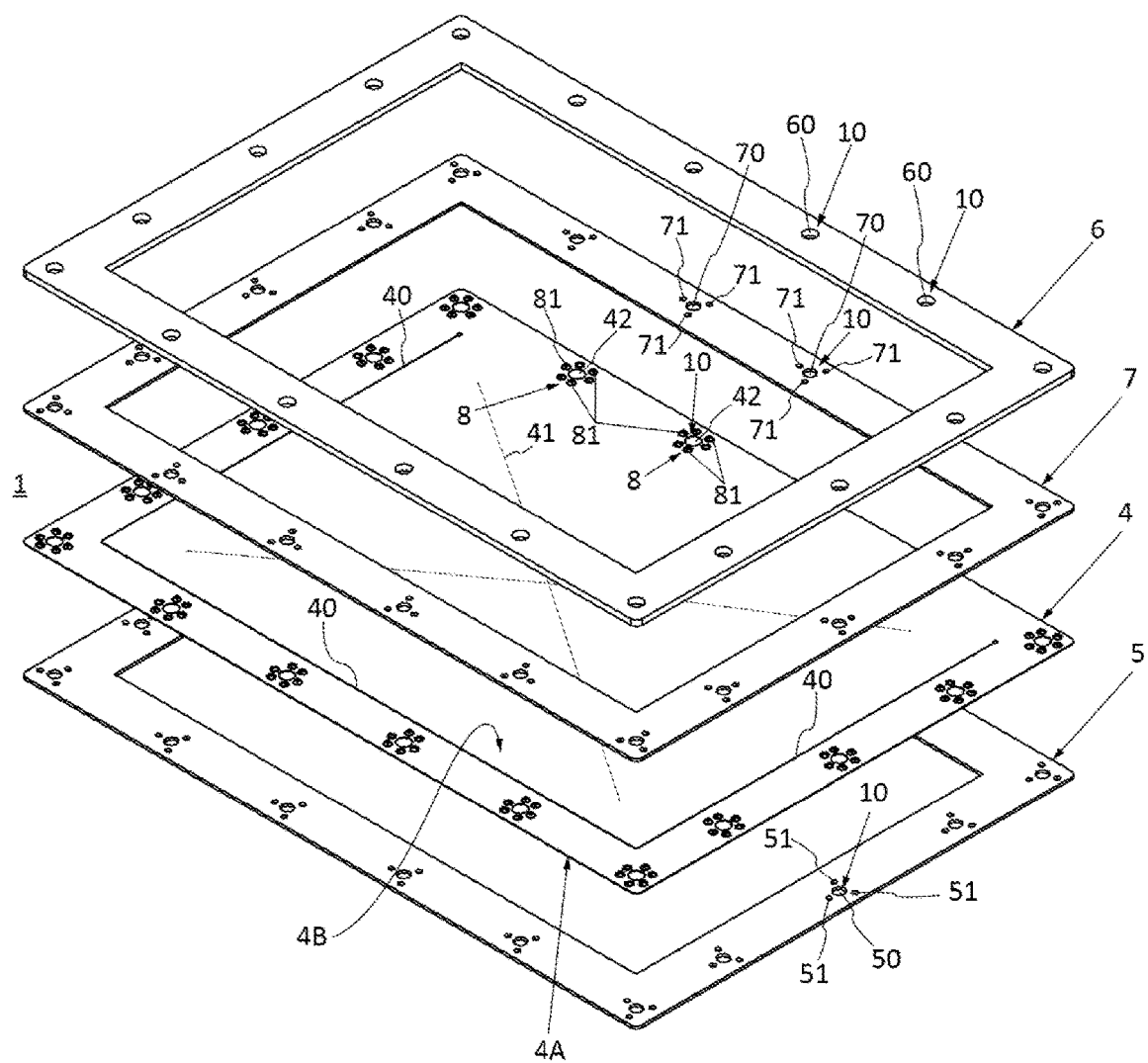
FIG. 2 is a perspective exploded view of the explosion venting panel of FIG. 1 that shows tightening adjustment means according to the invention.

To give way to the tightening means 3 (FIG. 5), in particular to the screw body 32, the explosion venting panel 1 comprises fixing openings 10 that are preferably regularly spaced (FIG. 1). Each fixing opening 10 of the panel 1 (FIG. 2 and FIG. 4) corresponds to respective borings and in front 60 of the clamping frame 6, 70 of the interface gasket 7, 42 of the sheet 4 and 50 of the support gasket 5. The borings 50 and 70 of the support gaskets 5 and of the interface gasket 7 has a diameter adapted to the cross-section of the tightening means 3, such as the screw body 32 or a threaded rod, designed for introduction into the fixing opening 10 of the explosion venting panel, so that, when pressing the gaskets, the material of the gaskets is inserted into the thread of the tightening means, which guarantees perfect watertightness.

In order to leisurely pressure the support gasket 5 all around, and preferably the interface gasket 7 as well, the operator must achieve a controlled torque tightening for each tightening means 3. To do so, the explosion venting panel 1 according to the invention comprises the tightening adjustment means 8, wherein the tightening adjustment means 8 are integrated in a monobloc way to the sheet 4 and are located around each boring 42 of the sheet 4. Preferably, there are several tightening adjustment means 8 for each boring 42 of the sheet and they are distributed in a balanced way around the boring 42. The tightening adjustment means 8 make it possible to the operator to stop the tightening at the moment where they feel a hardening when compressing the support seal gasket 5 that is sandwiched between the sheet 4 and the rigid surface 21 of the enclosure 2. The tightening adjustment means 8 abut (FIG. 5) the rigid surface 21 of the enclosure 2 opposite to the metallic sheet 4. The homogeneous distribution of the tightening adjustment means 8 around each boring 42 of the sheet 4 provides a compression with equal thickness around each boring 42.

Figure 3:
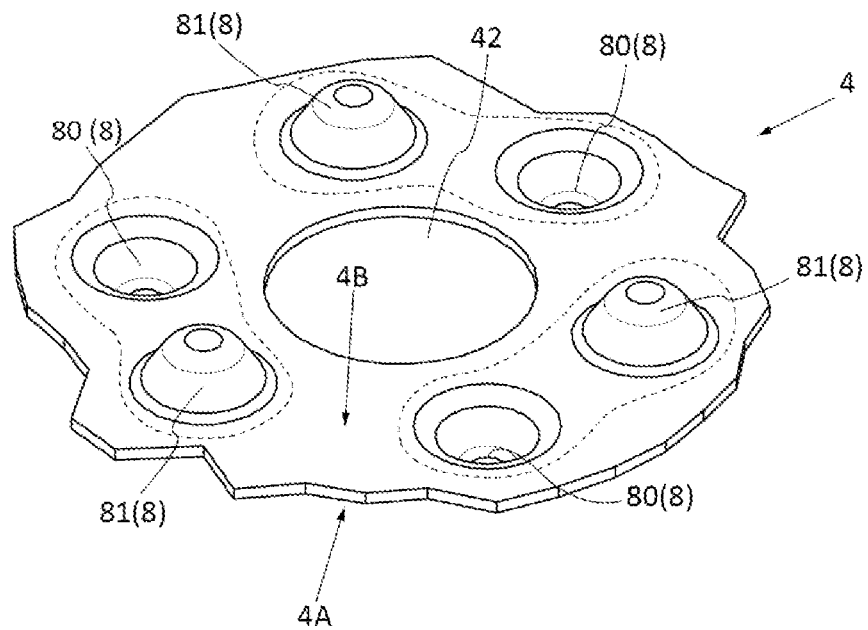
FIG. 3 is a partial perspective view of the rupture sheet of the explosion venting panel of the example of FIG. 2, which shows the tightening adjustment means more in details.

As pictured in details in FIG. 3 and in FIGS. 4 and 5, the tightening adjustment means 8 constitute, for example, embossments 80 at least on the lower face 4A of the sheet 4, and preferably embossments 81 on the upper face 4B too. Embossments 80 and 81 result preferably from a drawing operation, in order to deform the metal of the sheet 4 in a localized way and on a given height. Hence, the tightening adjustment means 8 connected to the sheet 4 protrude from at least one of the faces, preferably from each of the faces 4A and 4B of the sheet 4. The embossments 80 and 81 extend in opposite directions, perpendicular to the general plane of the sheet 4.

The tightening adjustment means 8 are laid out on at least a face of the sheet 4, in particular at least on the lower face 4A in contact with the support gasket 5 that is designed to be pressed against the enclosure 2 to protect. This provides a calibration of the thickness of the support gasket 5 around the opening of the enclosure 2 to guarantee, above all, the watertightness against the enclosure 2.

Preferably, the tightening adjustment means 8 are located on each of the lower 4A (embossments 80) and upper 4B (embossments 81) faces of the sheet 4 in order to calibrate the compression of the support gasket 5, on one hand, and of the interface gasket 7, on the other hand, simultaneously. This calibration on both sides of the metallic sheet 4, thus of the weakening zone 40 that is covered, on each faces of the sheet 4, by the support gasket 5 and the interface gasket 7, prevents too much crushing said gaskets against said weakening zone 40. Else, there is a risk of too much compressing and tearing it.

The embossments 80 and 81 have here a frustoconical shape and have a circular base, but they can have another shape.

The tightening adjustment means 8 associated with a face of the sheet 4 (the embossments 80 and 81) are distributed homogeneously around each boring 42 of the sheet, thus around each fixing opening 10 of the explosion venting panel, in order to generate a balanced compression along the thickness of the gasket associated to said tightening adjustment means 8 (to said embossments). The number of embossments 80 and 81 is advantageously a function of the diameter of the fixing opening 10 of the panel 1. For example, for a diameter of the fixing opening of 12 mm, the number of embossments 80 on the lower face 4A can be three, and the number of embossments 81 on the upper face 4B is three as well.

Preferably, when each of the lower face 4A and upper face 4B comprises embossments 80 and 81, they are laid out as close pairs of an embossment 80 on one face and an embossment 81 on the other face (as schematized by dot contouring on FIG. 3), which makes it possible to reduce the full zone between two opposite embossments 80 and 81 of a pair, and to reduce the risk of deformation of the sheet 4 between two opposite and close embossments 80 and 81 when tightening, in order to prevent the crushing the sealing gaskets 5 and 7 in an abnormal way.

The height (perpendicular to the plane of the sheet 4) of an embossment 80, 81 is adapted to match the desired compression of the associated seal gasket-support gasket 5 or interface gasket 7—that is solidary with the face the embossment protrudes from. For the embossments 80 of the lower face 4A, their height matches the dimension of ideal compression of the support gasket 5 to secure the watertightness around the opening of the enclosure 2. For the embossments 80 and 81 of the two opposite faces 4A and 4B of the sheet, their height is adapted so that the crushing of the two respective support gaskets 5 and interface gasket 7 does not generate a degradation of the weakening zone 40. The height of the embossments is, for example, 2 mm when the thickness of the support gasket 5 and of the interface gasket 7 is, for example, 4 mm.

In addition, when pressing each support gasket 5 and each interface gasket 7, in order to make the abutment of the tightening adjustment means 8 (embossments 80 and 81) against a hard surface (surface 21 of the enclosure and lower face of the clamping frame 6), the support gasket 5 and the interface gasket 7 comprise (as shown more in detail in FIG. 4) (through) holes 51 and resp. 71 around each of their respective panel fixing borings 50 and 70, which are in front of the tightening adjustment means 8 (in front of resp. embossments 80 and 81).

The fixing of the explosion venting panel 1 is implemented the following way: The sheet 4 that integrates the tightening adjustment means 8 and the sealing gaskets 5 and 7 is positioned around the opening of the enclosure 2. Then, the clamping frame 6 is inserted on it. At last, the removable tightening means 3 will be inserted at each of the fixing openings 10. The tightening by the tightening means 3 generates the compression of the support gasket 5 and of the interface gasket 7. The tightening becomes enough (matching the optimal tightening torque) when the end of the embossments 80 and 81 abuts, resp. the rigid surface 21 of the enclosure 2 and the clamping frame 6 (FIG. 5).

The invention claimed is:

1. An explosion venting panel (1) comprising a metallic sheet (4) with a weakening zone (40), a frame (6) called clamping frame, which is laid out on the rim of the sheet (4), and at least one sealing gasket (5, 7) including a sealing gasket called support gasket (5) which is laid out at least on the rim and against the sheet (4) opposite to the clamping frame (6), and tightening adjustment means (8), wherein the panel comprises fixing openings (10) all through the clamping frame (6), the sheet (4) and said at least one sealing gasket (5, 7), characterized in that the tightening adjustment means (8) are integrated in a monobloc way to the sheet (4).

2. An explosion venting panel according to claim 1, characterized in that the tightening adjustment means (8) are laid out on at least a face of the sheet (4) and around borings (42) that are parts of the fixing openings (10).

3. An explosion venting panel according to claim 2, characterized in that the tightening adjustment means (8) are laid out on at least the face called lower face (4A) of the sheet (4) relatively to the support gasket (5).

4. An explosion venting panel according to claim 1, wherein the sheet has two opposite faces (4A, 4B), characterized in that the tightening adjustment means (8) are laid out on the two opposite faces (4A, 4B) of the sheet and around fixing openings (10).

5. An explosion venting panel according to claim 1, characterized in that the tightening adjustment means (8) constitute embossments (80, 81).

6. An explosion venting panel according to claim 5, characterized in that the embossments are resulting from a strain induced by stamping of the sheet (4).

7. An explosion venting panel according to claim 1, characterized in that the tightening adjustment means (8) constitute an alternation of several embossments (80, 81) on each of the faces (4A, 4B) of the sheet (4).

8. An explosion venting panel according to claim 7, characterized in that the embossments (80, 81) are distributed all around a boring (42) of the sheet that constitutes a part of a fixing opening (10), wherein the distribution of the embossments on the two opposite faces (4A, 4B) of the sheet is such that the embossment of a face and the embossment immediately next to the opposite face constitute a pair, whose discrepancy is shorter than the discrepancy in another pair of embossments.

9. An explosion venting panel according to claim 1, characterized in that the tightening adjustment means (8) are distributed in a balanced way all around the fixing openings (10).

10. An explosion venting panel according to claim 1, characterized in that said at least one sealing gasket (5, 7) comprises holes (51, 71) in front of the tightening adjustment means (8).

11. An explosion venting panel according to claim 1, characterized in that said at least one sealing gasket (5, 7) comprises borings (50, 70) that constitute parts of the fixing openings (10), wherein each boring (50, 70) in said at least one gasket has a diameter adjusted to the section of tightening means (3) designed for introduction into the fixing openings (10).

12. An explosion venting panel according to claim 11, characterized in that the material of the sealing gasket is designed for insertion into the thread of threaded bodies (32) of the tightening means (3).

13. A method of using an explosion venting panel according to claim 1 for silos, tanks, battery containers, filtration systems or handling machines or machines for material processing.

* * * * *